April 5, 1927.
D. B. BROOKS
1,623,906
NOVELTY
Filed Sept. 25, 1926   2 Sheets-Sheet 1
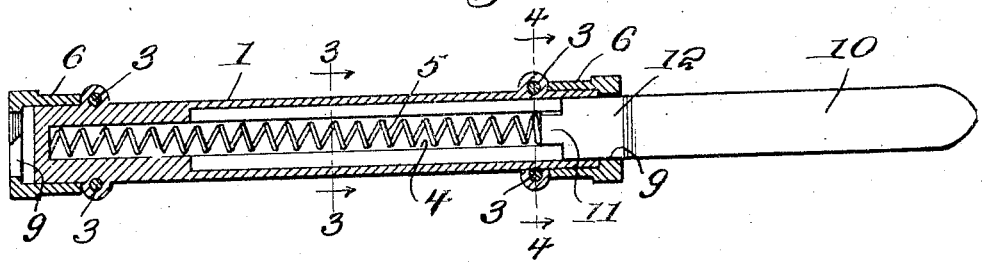
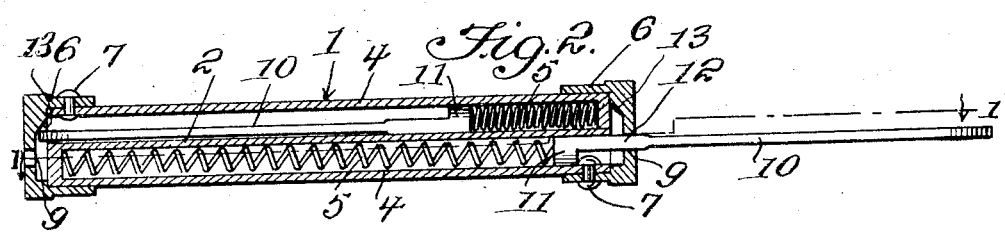
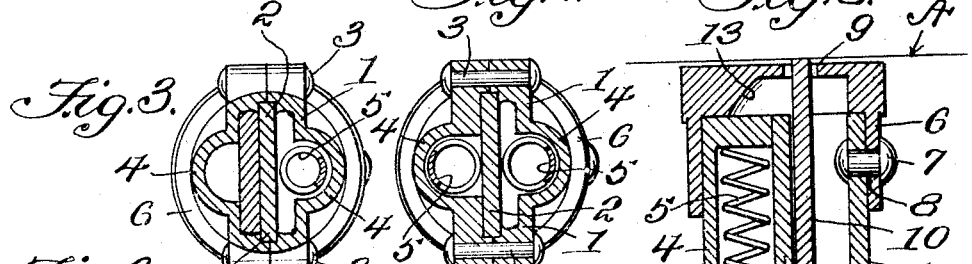
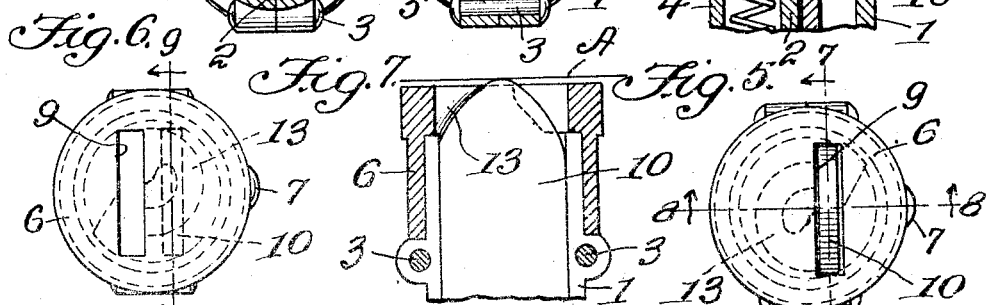
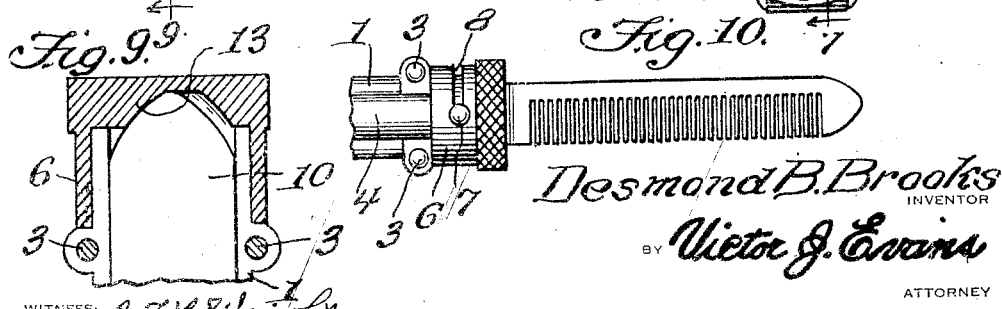
Desmond B. Brooks
INVENTOR
BY Victor J. Evans
ATTORNEY
WITNESS:

April 5, 1927.　　　D. B. BROOKS　　　1,623,906
NOVELTY
Filed Sept. 25, 1926　　2 Sheets-Sheet 2
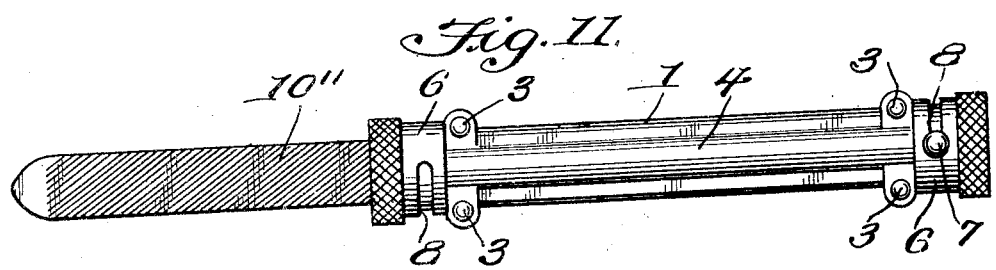
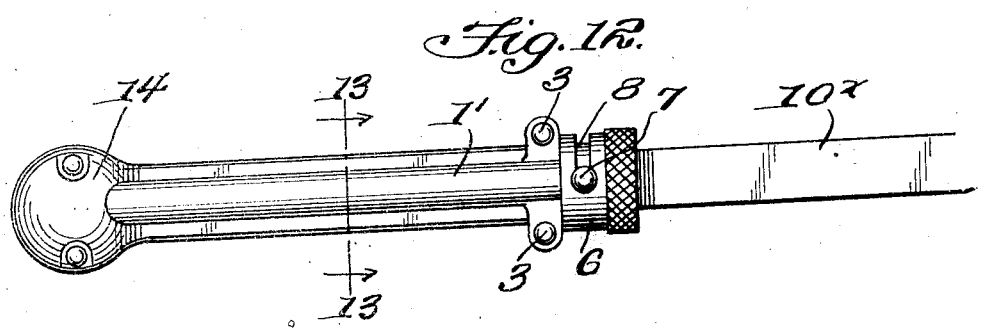
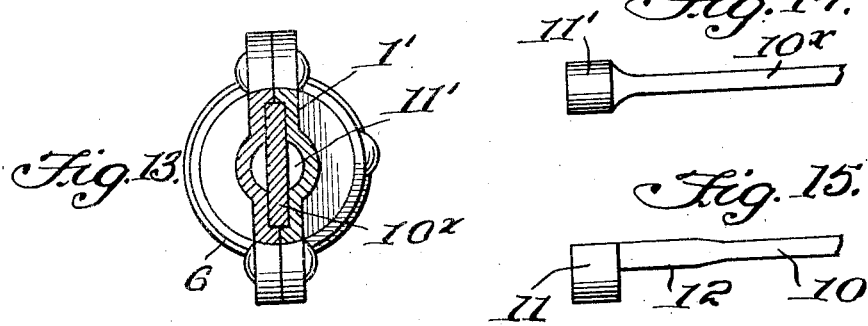
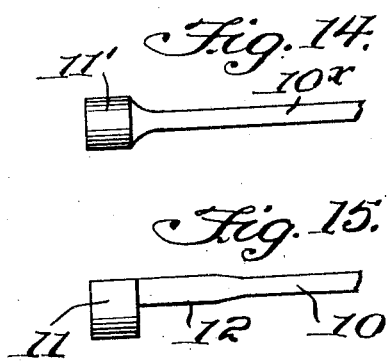
Desmond B. Brooks,
INVENTOR
BY Victor J. Evans
ATTORNEY
WITNESS: J. T. L. Wright Patented Apr. 5, 1927.

1,623,906

UNITED STATES PATENT OFFICE.

DESMOND B. BROOKS, OF HARTUN, COLORADO.

NOVELTY.

Application filed September 25, 1926. Serial No. 137,751.

This invention relates to a novelty, the general object of the invention being to provide a handle having a blade member slidably mounted therein, with spring means tending to hold the blade member in projected position, but permitting the blade member to be pushed inwardly into the handle.

Another object of the invention is to provide a cover rotatably mounted on the handle and having a cam part for engaging the pointed end of the knife member, when the knife member has been partly pushed into the handle, for moving the knife member into the handle and holding it there.

A further object of the invention is to make the handle with two compartments, with a knife in each compartment, and to provide the handle with a rotary member at each end thereof, each member having a slot therein through which the knife member will extend, with means on each member for holding the knife within the handle member.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 1 is a section on line 1—1 of Figure 2.

Figure 2 is a section taken at right angles to Figure 1.

Figure 3 is a section on line 3—3 of Figure 1.

Figure 4 is a section on line 4—4 of Figure 1.

Figure 5 is a plan view, with the slot in the end member in alignment with the blade.

Figure 6 is a view similar to Figure 5, but showing the slot out of alignment with the blade.

Figure 7 is a section on line 7—7 of Figure 5.

Figure 8 is a section on line 8—8 of Figure 5.

Figure 9 is a section on line 9—9 of Figure 6.

Figure 10 is a view of a modification, showing the blade member in the form of a comb.

Figure 11 is a view of this modification, showing the second knife member in the form of a nail file.

Figure 12 is a view of a further modification, showing the device provided with but a single knife member.

Figure 13 is a section on line 13—13 of Figure 12.

Figure 14 is a view of the knife member used with the single form of the invention.

Figure 15 is a partial view of the knife member used with the double form of the invention.

In these drawings, 1 indicates the handle member which is divided into two chambers by a partition 2, the handle member being formed of two sections which are fastened together with the partition between them by the rivets 3. Each section is provided with a central semi-circular rib 4 which forms a casing for a coil spring 5, one spring being placed at one end of one chamber and at the opposite end of the other chamber. Each end of the handle member is closed by a rotatable cap 6 which is limited in its movement through means of the rivet 7 passing through the handle member and through a slot 8 formed in the flange of the cap. The cap is provided with a slot 9 in its top which is placed to one side of the center and in one position of the cap, this slot will register with one chamber and in another position of the cap, it will register with the other chamber. A knife member 10 is slidably mounted in each chamber, said knife member having an enlargement 11 at its inner end which is shaped to engage the space formed by the rib 4 and the face of this enlargement engages the spring 5, the spring tending to hold the knife projected. The shank of the knife member is made thicker than its blade part, as shown at 12, so that it will snugly fit the slot 9 when the knife member is projected and thus hold the blade against lateral movement.

As will be seen, when the cap at one end of the handle is turned to bring the opening 9 in register with the chamber which has its open end adjacent the cap, the spring will project the knife in said chamber through the opening until its enlargement strikes the head of the rivet 7, when further movement of the knife will be prevented. If the other cap is turned, the second knife will be projected by its spring.

By pressing the blade or knife member against a surface, such as shown at A in Figure 8, the blade will be forced into the handle member again. It will be projected again by its spring unless the cap is turned, and when this is done, a cam part 13 on the inner face of the cap will engage the point of the knife adjacent an edge thereof and thus push the knife member further into the handle member, and as the cap continues in its rotary movement, the cam part will finally force the knife further into the handle member until its point is below the wall of the opening and said opening can pass beyond the knife member, as shown in Figure 6. In this case, the knife will be held within the handle member until the cap is again turned.

In the modification shown in Figures 10 and 11, one of the knife members is made in the form of a comb, as shown at 10' in Figure 10, while the other knife member is made in the form of a file, as shown at 10" in Figure 11.

Figures 12 and 13 show the device provided with but a single blade 10ˣ which projects from one end of the handle member 1'. The other end of the handle member is closed, as shown at 14. In this form, the knife member is provided with a circular enlargement 11' to fit the round bore formed by the semi-circular ribs of the sections of the handle member 1'.

This device will afford considerable amusement to children and adults, as well as serving useful purposes by using it as a cutting tool or as a comb or nail file. For instance, it can be used on the stage or elsewhere to give the appearance of one person stabbing another or himself, for as the blade strikes the person, it will push into the handle, but it will appear that the blade is entering the person. By painting or otherwise marking one side of the blade red, the handle may be given a half turn when it is being pulled away from the person so that the audience will apparently see the blade covered with blood leaving the body of the person stabbed.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:—

1. A device of the class described comprising a handle member, a blade member slidably mounted therein, a spring within the blade member for projecting the knife member, a cap rotatably mounted on the handle member and having a slot therein which, when the cap member is turned in one position, will permit the spring to force the blade member therethrough, and a cam part on the cap for engaging the pointed end of the knife member to force the same into the handle member, after the blade member has been partly pushed into the handle member to cause the solid part of the cap to engage the knife member to hold the same in retracted position.

2. A device of the class described comprising a handle member, a blade member slidably mounted therein, a spring within the blade member for projecting the knife member, a cap rotatably mounted on the handle member and having a slot therein which, when the cap member is turned in one position, will permit the spring to force the blade member therethrough, a cam part on the cap for engaging the pointed end of the knife member to force the same into the handle member, after the blade member has been partly pushed into the handle member to cause the solid part of the cap to engage the knife member to hold the same in retracted position, the shank of the knife member adjacent its inner end being thicker than the rest of the knife member to snugly engage the slot to prevent lateral movement of the knife member.

3. A device of the class described comprising a handle member formed of two sections fastened together, each section having a rounded rib extending longitudinally along its center for forming a semi-circular interior recess, a knife member having a rounded enlargement at its inner end for engaging the recess, a spring in the handle member for engaging the face of the enlargement and acting to project the knife member and means for holding the knife member within the handle member.

In testimony whereof I affix my signature.

DESMOND B. BROOKS.